Dec. 20, 1955     E. KOMUSIN     2,727,687
DEVICE FOR RECORDING AND ADDING NUMBERS
Filed Sept. 12, 1952     2 Sheets-Sheet 1
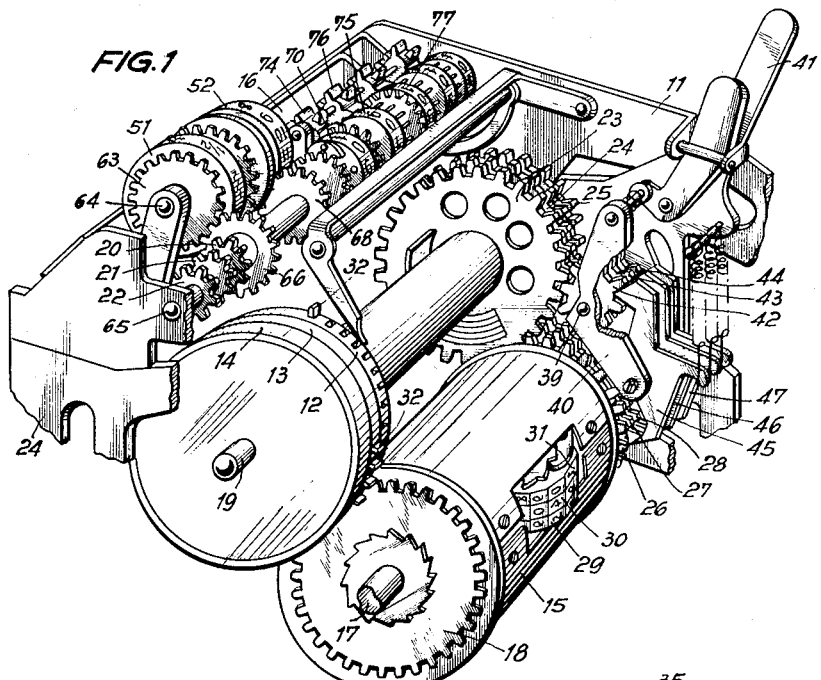
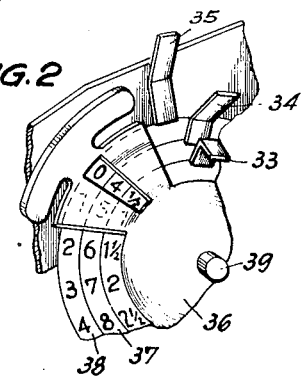
INVENTOR Dec. 20, 1955     E. KOMUSIN     2,727,687
DEVICE FOR RECORDING AND ADDING NUMBERS
Filed Sept. 12, 1952     2 Sheets-Sheet 2
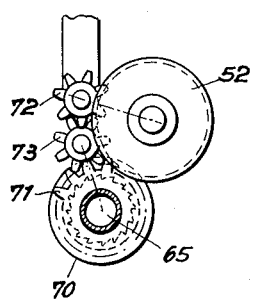
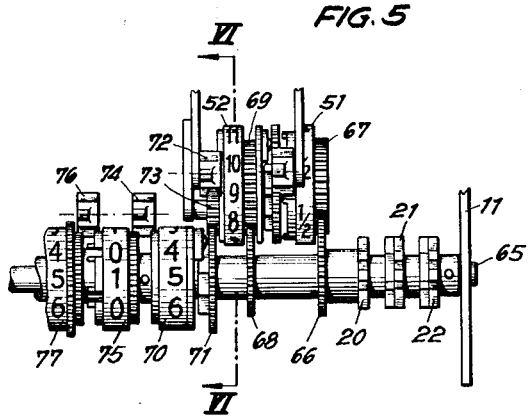
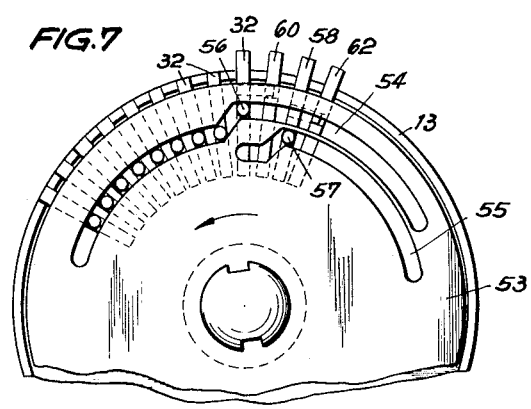
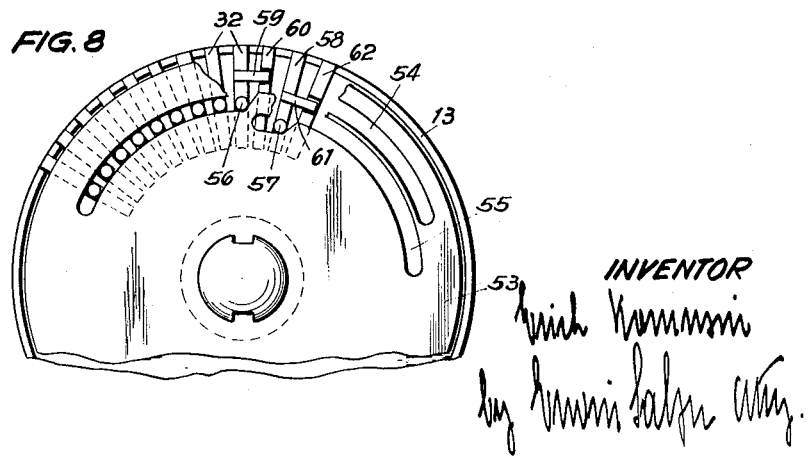
INVENTOR

United States Patent Office 2,727,687
Patented Dec. 20, 1955

2,727,687
DEVICE FOR RECORDING AND ADDING NUMBERS

Erich Komusin, Frankfurt am Main, Germany
Application September 12, 1952, Serial No. 309,263
9 Claims. (Cl. 235—101)

The present invention relates to devices for recording and adding numbers, such as money amounts, weights, lengths. Such devices may, for example, be used in cash registers, in which amounts of moneys received are recorded on receipt slips and are added for indicating the total of the receipts, or they may be used in franking apparatus, in which amounts of moneys are recorded on letters or other packages for franking the same and are, again, added for indicating the total of the amounts or they may be used in connection with weighing devices for recording or adding up weights.

It is an object of the invention to provide such an improved device for recording and adding numbers which is simple in construction.

It is another object of the invention to provide a device for recording and adding amounts of money, weight, length and the like, which can be used for different money systems, that is to say for decimal and for different non-decimal money systems, by interchanging a few parts only of each device to adapt it to the special requirements of each case, without the necessity of fundamentally altering the general construction and outlay of the devices.

It is another object of the invention to provide a device comprising a recording mechanism and an adding mechanism, wherein besides at least one number wheel for a decadic sequence of number values at least one further number wheel for a non-decadic sequence of number values is provided and, on exceeding the sequence of each number wheel, a transfer of movement to the next higher number wheel is effected, and wherein in the recording mechanism the non-decadic values of a series of values are distributed over a plurality of recording wheels.

It is another object of the invention to provide a device comprising a recording mechanism and an adding mechanism wherein at least one of the number wheels carries a plurality of succeeding sequences of number values and wherein means are provided for stepping the next higher number wheel forwards between the end of one and the beginning of the next succeeding sequence of said first mentioned number wheel.

It is still another object of the invention to provide a device comprising a recording mechanism and an adding mechanism wherein a number wheel carrying non-decadic values is connected to a non-decadic toothed driving wheel which is operable by means of a spoked wheel through a toothed wheel usable for devices for adding a decimal system.

It is a further object of the invention to provide a device comprising a recording mechanism and an adding mechanism wherein a non-decadic number wheel is connected to a decadic number wheel in such a manner that only after each complete revolution of the non-decadic number wheel movement is transferred from said non-decadic wheel to said next higher decadic wheel.

These and other objects and advantages of the invention will become apparent from the following detailed description of some embodiments of the invention when read in conjunction with the accompanying drawings, in which:

Fig. 1 is a general perspective view of an embodiment of the invention as applied to a franking apparatus, some parts being broken away;

Fig. 2 is a perspective view of a detail of the embodiment on a larger scale;

Fig. 3 is a development into the plane of the drawing of the scales provided on fee-stamp wheels of the embodiment;

Fig. 4 is a similar development of the scales provided on number wheels of the adding mechanism of the embodiment;

Fig. 5 illustrates the adding mechanism in elevation on a smaller scale;

Fig. 6 is a section along the line VI—VI of Fig. 5;

Fig. 7 illustrates another detail of the embodiment in elevation on a larger scale; and Fig. 8 illustrates the detail of Fig. 7 in a different operative position with some parts broken away.

The franking apparatus illustrated in the drawings comprises a frame 11 (Fig. 1) carrying three spoked wheels 12, 13 and 14 of a setting mechanism, a stamping roller 15 for recording a stamp fee on a postal package, and an adding mechanism 16 for adding the stamp fees applied to postal packages. On actuating the device for franking a postal package, the stamping roller 15 performs one revolution around its spindle 17. A toothed wheel 18 of the stamping roller 15 meshes with another toothed wheel, not visible in the drawings, of the same size and connected to the spoked wheels 12, 13 and 14 so that the spoked wheels 12, 13 and 14 likewise perform a complete revolution around their spindle 19.

Each spoke of the spoked wheels 12, 13 and 14 can be set, as will be described in greater detail further below so that its end either protrudes beyond the periphery of the respective spoked wheel or lies flush therewith. While the spoked wheels 12, 13 and 14 perform one revolution the pre-set protruding spokes of each spoked wheel act respectively on toothed wheels 20, 21 and 22 of the fee adding mechanism 16.

Each spoked wheel co-operates with a setting disc 53 (see Figs. 7 and 8) for setting the spokes 32 (Figs. 1, 7 and 8) of the respective spoked wheel individually and successively into their protruding position, the setting discs being each connected by a hollow shaft to one of three toothed wheels 23, 24 and 25, which mesh with further toothed wheels 26, 27 and 28 of the same size and are keyed to the stamping roller 15. The further toothed wheels 26, 27 and 28 are, in turn, coupled in any known manner to stamp wheels 29, 30, 31 of the stamping roller 15, for example by means of conical wheels and toothed wheels arranged in the interior of the stamping roller 15. Thus, the stamp wheels 29, 30 and 31, which effect the recording of the franking stamp, are mechanically coupled to the setting discs of the spoked wheels 12, 13 and 14, the arrangement being such that the setting of the stamp wheels 29, 30 and 31 always agrees with the setting of the spokes 32 on the spoked wheels 12, 13 and 14.

To set the stamp wheels 29, 30 and 31 and the spokes of the spoked wheels 12, 13 and 14 jointly to a desired value, three setting levers 33, 34 and 35 (Fig. 2) are provided, which are coupled to the toothed wheels 23, 24 and 25. Each of the setting levers 33, 34 and 35 is connected to a number disc 36, 37 and 38 rotatably arranged on a spindle 39 for indicating the fee value to which the arrangement has been set. The spindle 39 is mounted in a separate bracket 40 (see Fig. 1), which can be tilted relatively to the frame 11 by means of the lever 41. In the planes of the toothed wheels 23, 24 and 25, the spindle 39 carries three additional toothed wheels 42, 43 and 44 which on tilting of the bracket 40 engage the toothed wheels 23, 24 and 25. The additional toothed wheel 42 is rigidly connected to the number disc 36 and its setting lever 33 by means of the shaft 39. The additional toothed wheel 43 is rigidly connected to the number disc 37 and its setting lever 34 by means of a hollow shaft, and the additional toothed wheel 44 is rigidly connected to the number disc 38 and its setting lever 35 by means of a further hollow shaft.

A rotation of the setting levers 33, 34 and 35 while the additional toothed wheels 42, 43 and 44 are engaged with the toothed wheels 23, 24 and 25 respectively thus causes a rotation of the stamp wheels 29, 30 and 31 and a corresponding setting of the spokes 32 of the spoked wheels 12, 13 and 14. The setting levers 33, 34 and 35 and the additional toothed wheels 42, 43 and 44 can, however, only be rotated while the said additional toothed wheels 42, 43 and 44 are in engagement with the toothed wheels 23, 24 and 25 respectively since, when the said wheels are disengaged from one another, locking fingers 45, 46 and 47 engage the additional toothed wheels 42, 43 and 44, whereby rotation of the same is prevented. By suitable means not shown, the stamp wheels 29, 30 and 31 and the setting discs of the spoked wheels 12, 13 and 14 are similarly locked against unintentional displacement while the additional toothed wheels 42, 43 and 44 do not engage the toothed wheels 23, 24 and 25.

The stamp wheels 29, 30 and 31, are, in principle, decadic, that is to say they are each provided with ten stamping surfaces, and consequently the number disc 36, 37 and 38 and the setting levers 33, 34 and 35 each also enable ten different settings. This construction as such corresponds to the requirements of decimal money systems. For adapting the device, nevertheless, to non-decimal money systems, the device shows the features which will now be explained by reference to the English non-decimal money system of pence, shillings and pounds. In this system, the lowest series of values comprises twelve units of pence, that is to say, twelve pence form one unit of the next series of values, namely one shilling. For the franking of postal packages, not only integral pence values but also halfpenny values are required. The non-decimal series of pence is distributed over the two stamp wheels 29 and 30 of the stamping roller 15 in the manner illustrated in Fig. 3. The number discs 36 and 37 for setting the stamp wheels are inscribed in an analogous manner. Owing to the provision of halfpenny values in the British money system, the lower integral penny values and their intermediate halfpenny values of the non-demical sequence of values on one of the stamp wheels, namely on the stamp wheel 29, and the upper integral values of the non-decimal sequence of penny values on a further stamp wheel, namely the stamp wheel 30, it is possible by means of the two decadic stamp wheels 29 and 30 to set the stamping roller 15 to any desired penny and halfpenny value of the non-decimal series of penny values. The third stamp wheel 31 comprises a sequence of shilling values in known manner. Thus, it is not necessary to alter the mechanical construction of the free stamping mechanism and the means for setting the same, when changing from a decimal money system to a non-decimal money system; it is sufficient only to alter the inscribed sequences on the stamp wheels 29, 30 and 31 and on the number discs 36, 37 and 38.

However, certain mechanical adaptations are required in the adding mechanism 16 and the spoked wheels 12, 13 and 14 which will now be described. Since the values of the stamp wheel 29 for the lowest value series increase by halfpenny amounts, each spoke 32 of the spoked wheel 12, which is allotted to the stamp wheel 29, corresponds to the value of a halfpenny. Correspondingly, a number wheel 51 of the adding mechanism 16, which is controlled by the said spoke wheel 12, carries six number sequences "0, ½" as is illustrated in Fig. 4, and the said number wheel is so constructed that after each sequence "0, ½," a transfer of movement to the next higher number wheel 52 takes place, which carries the number sequence "0, 1, 2 . . . 10, 11." When, for example, on the stamp wheel 29 the value 3½ pence has been set and thereby on the spoked wheel 12 seven spokes have been rendered effective then, on rotation, the number wheel 51 of the adding mechanism passes through three sequences "0, ½" to the next following value ½. Each time, the number wheel 51 passes from the value "½" of one sequence to the value "0" of the next sequence, the number wheel 52 is rotated through one step in known manner so that it reaches the value "3."

Since the stamp wheel 30 of the fee-stamping roller 15 carries the number sequence "0, 4, 5 . . . 11" it is necessary that, on its rotation through the step from "0" to "4," four spokes 32 become effective on the corresponding spoked wheel 13, while on each further rotation through one step, one additional spoke 32 only becomes effective. To achieve this, the setting disc 53 of the spoked wheel 13 (Figs. 7 and 8) is provided with two control grooves 54 and 55 acting as cams and operating parallel to each other. In the zero position illustrated in Fig. 8, a stud 56 of the first spoke 32 lies at the beginning of an inclined portion of the control groove 54, and a stud 57 of an auxiliary spoke 58 lies at the beginning of an inclined portion of the control grove 55. When, now, the disc 53 of the spoked wheel 13 is rotated from its zero position shown in Fig. 8 through one step in anti-clockwise direction, then as shown in Fig. 7 the studs 56 and 57 of the spoke 32 and of the auxiliary spoke 58 are simultaneously shifted outwards by the control grooves 54 and 55 so that the said spokes protrude beyond the periphery of the spoked wheel. Moreover, to the spoke 32, a further spoke 60 is connected by a link 59, and to the auxiliary spoke 58, another spoke 62 is connected by a link 61. Consequently, after the first step of rotation of the setting disc 53, four spokes 32, 60, 58 and 62 protrude simultaneously beyond the periphery of the spoked wheel 13 and are in their effective position, while on each further step of rotation of the setting disc 53 only a single spoke 32 is additionally caused to protrude beyond the periphery of the spoked wheel 13. Thereby, it is achieved that on setting the stamp wheel 30 to an arbitrary value a number of spokes equal to such value becomes effective on the spoked wheel 13. If, for example, the stamp wheel 30 has been set to its fifth position in which the value "7" is ready for being stamped, then on the spoked wheel 13 likewise seven spokes are brought into their effective positions so that, on one revolution of the spoked wheel 13, the number wheel 52 of the adding mechanism 16 is stepped forward by seven units.

This number wheel 52 of the adding mechanism has to comprise the non-decimal sequence of pence from "0" to "11." Thus, it has to be capable of assuming twelve different positions and its driving wheel 69 (Fig. 5) has to be correspondingly constructed. Thus, the number wheel 52 and its driving wheel 69 are mechanically different from a decadic number wheel and its driving wheel used for this series of values in a decadic currency system. Since the duodecadic number wheel 52 and its driving wheel 69 require a somewhat larger space than an ordinary decadic number wheel and its driving wheel, the number wheels 51 and 52 are arranged on an auxiliary spindle 64 mounted on a separate bracket 63 and lying adjacent a spindle 65 of the adding mechanism 16. The toothed wheel 20 stepped by the spoked wheel 12 is rigidly connected to a toothed wheel 66 meshing with a toothed driving wheel 67 carried by the spindle 64. This driving wheel 67 carries the number disc 51 (Fig. 5). In a corresponding manner, the toothed wheel 21 operable by the spoked wheel 13 is connected to a toothed wheel 68 which meshes with the toothed driving wheel 69 on the auxiliary spindle 64 carrying the number wheel 52. The toothed wheel 22 operable by the spoked wheel 14 corresponds to the decadic shilling values and is directly coupled to the number wheel 70 rigidly connected to a toothed driving wheel 71. In an adding mechanism for an exclusively decadic number system the toothed driving wheel 21 would be rigidly connected to a decadic number wheel and the toothed driving wheel 69 with the duodecadic number wheel 52 would be lacking. The toothed driving wheel 20 would be rigidly connected to a decadic number wheel similar to decadic number wheel 51. Thus in the non-decadic adding mechanism according to the invention the arrangement of driving wheels 20, 21 and 22 is the same as in an exclusively decadic adding mechanism. A transfer wheel 72 controlled in a manner known per se by the number wheel 52 acts, after each complete revolution, on the said toothed driving wheel 71 by means of an intermediate wheel 73 (Fig. 6) and thus effects the stepping of the number wheel 70 by one unit.

By means of a transfer wheel 74, the number wheel 70, on each revolution, causes a stepping-forward of the number wheel 75 by one step. The number wheel 75 carries several sequences, each comprising the values "0, 1" on its periphery, since in the English currency system here considered the next higher series of values, namely the pounds, is divided into units of twenty shillings. Consequently, the number wheel 75 is so construced that whenever the number wheel 75 passes from the value "1" of one sequence to the value "0" of the next sequence, it steps the number wheel 77 of the pound value forward through one step by means of a transfer wheel 76.

These operative connections between the number wheels of the adding mechanism 16 are symbolically indicated in Fig. 4 by the arrows. In Fig. 4 one arrow between two number wheels indicates that after each complete revolution of the lower number wheel a single transfer to the next higher number wheel is effected, while two such arrows indicate that a plurality of transfers to the next higher number wheel is effected during each revolution of the lower number wheel. The transfer to the next higher number wheel may be effected by means of a transfer wheel of the kind of a Maltese gear known per se.

By arranging the non-decadic number wheels 51 and 52 on a separate auxiliary spindle 64, it is possible generally to retain the usual constructional elements of a decadic adding mechanism. In particular, the spoked wheels 12, 13 and 14 act, in any case, on the same toothed wheels 20, 21 and 22, independently of whether all the toothed wheels of the adding mechanism are decadic or some are non-decadic.

The size of the non-decadic number wheels depends on the money system in each case. While in the English money system the lowest series of values comprises twelve pence, the Indian money system, for example, comprises sixteen units in the lowest series of values; in this case, the number wheel 52 would have to be constructed for accommodating a sequence of 16 numbers.

I claim:

1. A device for recording and adding numbers in a non-decimal system comprising a recording mechanism having at least one type wheel for a decadic sequence of number values and at least two type wheels for a non-decadic sequence of number values, the values of said non-decadic sequence being distributed over a plurality of recording wheels, at least one setting means for setting a number value of a decadic sequence, at least two setting means for setting a number value of a non-decadic sequence, at least one spoked wheel with ten spokes, at least one spoked wheel the number of spokes of which is larger than ten, an adding mechanism under the control of said spoked wheels having at least one number wheel for a decadic sequence of number values and at least one further number wheel for a non-decadic sequence of number values, means for transferring the movement of a number wheel to the next higher number wheel on exceeding the sequence of each number wheel, means for actuating said recording mechanism, and means under the control of said recording mechanism for rotating said spoked wheels on actuation of said recording mechanism.

2. A device for recording and adding numbers in a non-decimal system comprising a recording mechanism having at least one type wheel for a decadic sequence of number values and at least two type wheels for a non-decadic sequence of number values, the values of said non-decadic sequence being distributed over a plurality of recording wheels, a plurality of decadic setting means, at least two setting means of said plurality coordinated to a non-decadic sequence of values, a plurality of spoked wheels controlled by said setting means at least one of said spoked wheels having more than ten spokes, an adding mechanism under the control of said spoked wheels having at least one number wheel for a decadic sequence of number values and at least one further number wheel for a non-decadic sequence of number values, means for transferring the movement of a number wheel to the next higher number wheel on exceeding the sequence of each number wheel, means for actuating said recording mechanism, and means under the control of said recording mechanism for rotating said spoked wheels on actuation of said recording mechanism.

3. A device as claimed in claim 2 wherein a setting disc of one spoked wheel operable by the decadic setting means and the spokes of said wheel are so arranged that the equal units of movement of the setting disc corresponds to unequal numbers of spokes.

4. A device as claimed in claim 2 wherein a plurality of spokes of at least one spoked wheel are connected to each other and are jointly displaced on displacement of a setting disc controlled by said decadic setting means.

5. A device as claimed in claim 2 wherein a recording wheel carries half a unit value and also initial values of a series of values and the intermediate half values of a non-decadic sequence.

6. A device as claimed in claim 2 wherein a recording wheel carries half a unit value and also initial values of a series of values and the intermediate half values of a non-decadic sequence and wherein a further recording wheel carries the remainder of the integral values of the series of values of a non-decadic sequence.

7. A device as claimed in claim 2 wherein in the adding mechanism the non-decadic values are arranged on a number wheel connected to a non-decadic toothed driving wheel which is operable by means of a spoked wheel through a toothed wheel of the kind usable also for an exclusively decadic number system, said non-decadic toothed driving wheel and said additional toothed wheel being arranged on two parallel shafts.

8. A device as claimed in claim 2 wherein in the adding mechanism the non-decadic values are arranged on a number wheel connected to a non-decadic toothed driving wheel which is operable by means of a spoked wheel through a toothed wheel of the kind usable also for an exclusively decadic number system, said non-decadic toothed driving wheel and said additional toothed wheel being arranged on two parallel shafts, and wherein in the adding mechanism before a non-decadic number wheel a number wheel is provided which carries a plurality of sequences "0, ½" on periphery thereof.

9. A device as claimed in claim 2 wherein in the adding mechanism the non-decadic values are arranged on a number wheel connected to a non-decadic toothed driving wheel which is operable by means of a spoked wheel through a toothed wheel of the kind usable also for an exclusively decadic number system, said non-decadic toothed driving wheel and said additional toothed wheel being arranged on two parallel shafts, and wherein in the adding mechanism before a non-decadic number wheel a number wheel is provided which carries a plurality of sequences "0, ½" on periphery thereof, and wherein for setting values on the recording mechanism and on a spoked wheel for setting the adding mechanism a setting member is provided for setting a half value and the initial integral values with intermediate half values of a series of values.

References Cited in the file of this patent

UNITED STATES PATENTS

| | | |
|---|---|---|
| 1,645,209 | Von Pein | Oct. 11, 1927 |
| 2,187,456 | Komusin | Jan. 16, 1940 |

FOREIGN PATENTS

| | | |
|---|---|---|
| 378,599 | Great Britain | Aug. 18, 1932 |